United States Patent
Chen

(10) Patent No.: US 7,826,704 B2
(45) Date of Patent: Nov. 2, 2010

(54) LOW-EMISSIVITY GLASS

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 484 days.

(21) Appl. No.: 11/955,284

(22) Filed: Dec. 12, 2007

(65) Prior Publication Data
US 2008/0231979 A1    Sep. 25, 2008

(30) Foreign Application Priority Data
Mar. 21, 2007    (CN)    ............ 200710200311

(51) Int. Cl.
G02B 6/10    (2006.01)
G02B 5/26    (2006.01)
B32B 17/06    (2006.01)

(52) U.S. Cl. .............. 385/131; 385/141; 359/839; 428/426; 428/433; 428/428

(58) Field of Classification Search ............ 385/129, 385/130, 131, 141, 142, 144, 14; 65/385, 65/386; 359/839; 428/426, 433, 428
See application file for complete search history.

(56) References Cited

U.S. PATENT DOCUMENTS

| | | | |
|---|---|---|---|
| 4,659,178 A * | 4/1987 | Kyogoku | 359/590 |
| 6,562,445 B2 | 5/2003 | Iwamura | 428/217 |
| 6,859,323 B1 * | 2/2005 | Gasloli et al. | 359/589 |
| 7,005,188 B2 * | 2/2006 | Anderson et al. | 428/432 |
| 2004/0200238 A1 * | 10/2004 | Hyodo et al. | 65/60.2 |
| 2007/0281168 A1 * | 12/2007 | Varanasi et al. | 428/426 |
| 2008/0231979 A1 * | 9/2008 | Chen | 359/839 |

* cited by examiner

*Primary Examiner*—Brian M Healy
(74) *Attorney, Agent, or Firm*—Jeffrey T. Knapp

(57) ABSTRACT

A Low-E glass includes a glass substrate and a multilayer Low-E film formed on at least one surface of the glass substrate. The multilayer Low-E film includes a number of high refractive index layers and a number of low refractive index layers stacked on one another. An innermost layer contacting with the glass substrate is the high refractive index layer. A total number of layers of the multilayer Low-E film is in a range from 30 to 40.

11 Claims, 7 Drawing Sheets

LOW-EMISSIVITY GLASS

BACKGROUND OF THE INVENTION

1. Field of the Invention

The present invention relates to glass and, particularly, to a low-emissivity glass (Low-E Glass).

2. Description of Related Art

Most manufactured glass are designed to pass frequencies in a specific bandwidth and reflect frequencies outside of this desired bandwidth. Low-E glass is capable of inhibiting infrared (IR) frequencies and allows the frequencies of the visible light. Low-E glass reflects most, if not all IR frequencies and allows visible light frequencies to pass through the Low-E glass. Because the Low-E glass has high light transmittance rate and excellent heat preservation characteristics, it is widely used as car windows, home skylight windows, glass walls for buildings, etc.

Referring to FIG. 6, a typical Low-E glass includes a glass substrate 10 and a Low-E film 20 formed on a surface of the glass substrate 10. The Low-E film 20 includes a transition layer 21, a functional layer 22, and a protective layer 23. The transition layer 21, the functional layer 22 and the protective layer 23 are formed on the surface of the glass substrate 10, in that order. The transition layer 21 is provided to facilitate the functional layer 22 adhering to the glass substrate 10. Generally, the transition layer 21 is comprised of metal oxide materials. The functional layer 22 provides the optical characteristics of the Low-E glass. For example, the functional layer 22 may be configured for reflecting IR frequencies and passing the frequencies of visible light. Usually, the functional layer 22 is comprised of positive metal material, such as gold, silver, copper and so on. The protective layer 23 is provided to prevent the functional layer 22 from being scratched or abraded. Generally, the protective layer 23 is comprised of metal oxide materials.

Basically, four kinds of Low-E glass are popular. Single Low-E glass (SLE), double Low-E glass (DLE), Low-E sun layer glass (SLE), and Ti-Based Low-E glass (TLE). FIG. 7 shows spectra curves (i.e., transmittance (T) versus wavelength (λ) curves) of the above four kinds of Low-E glass. Clearly, the four kinds of Low-E glass have a low efficiency of transmittance, i.e., transmittance from about 50% to about 80%, in the visible light bandwidth (i.e., in the wavelength range from 380 nanometers to 780 nanometers). However, in the IR bandwidth, especially in an IR bandwidth having a range from 900 nanometers to 1100 nanometers, the four kinds of Low-E glass allow a high degree of transmittance, i.e., transmittance from about 10% to about 20%. Thus, car windows made of these kinds of Low-E glass cannot efficiently block IR frequencies.

Therefore, a Low-E glass having high transmittance in visible light bandwidth and excellent wearable property is desired.

SUMMARY OF THE INVENTION

A Low-E glass includes a glass substrate and a multilayer Low-E film formed on at least one surface of the glass substrate. The multilayer Low-E film includes a number of high refractive index layers and a number of low refractive index layers stacked one on another. An innermost layer contacting with the glass substrate is the high refractive index layer. A total number of layers of the multilayer Low-E film is in a range from 30 to 40.

Advantages and novel features will become more apparent from the following detailed description when taken in conjunction with the accompanying drawings.

BRIEF DESCRIPTION OF THE DRAWINGS

Many aspects of the present Low-E glass can be better understood with reference to the following drawings. The components in the drawings are not necessarily drawn to scale, the emphasis instead being placed upon clearly illustrating the principles of the present Low-E glass. Moreover, in the drawings, like reference numerals designate corresponding parts throughout the several views.

DETAILED DESCRIPTION OF THE INVENTION

Reference will now be made to the drawings to describe the embodiments of the present optical lens module, in detail.

Figure 1:
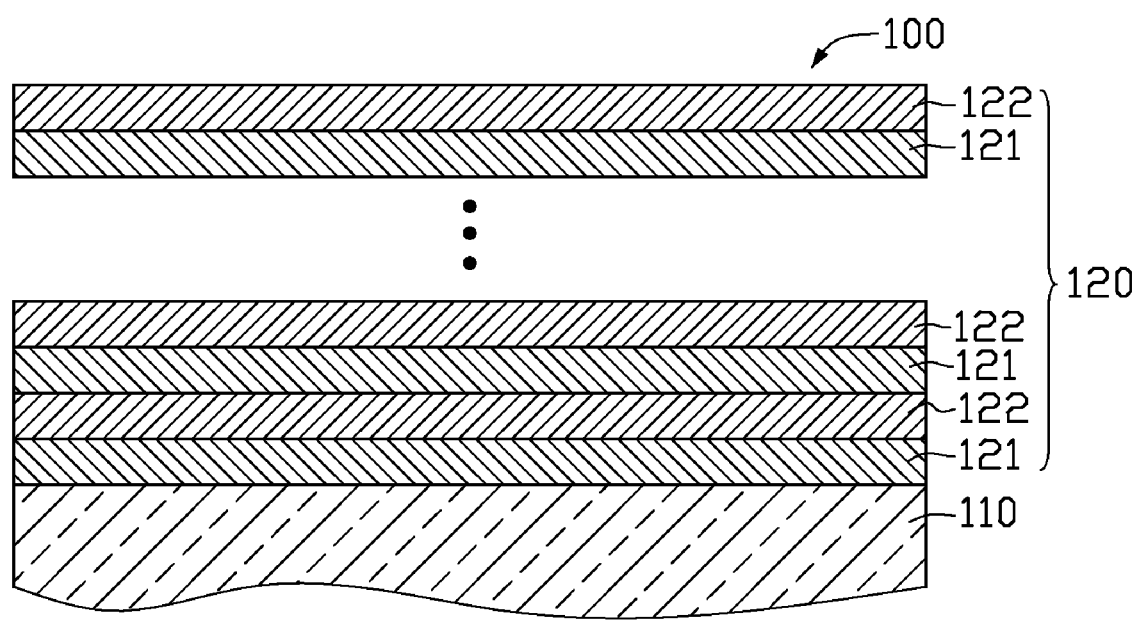
FIG. 1 is a schematic, cross-sectional view of a Low-E glass, in accordance with a present first embodiment.

Referring to FIG. 1, a Low-E glass 100, according to a first present embodiment, is shown. The Low-E glass 100 includes a substrate 110 and a multilayer Low-E film 120 formed on at least one surface of the substrate 110. The multilayer Low-E film 120 includes a number of high refractive index layers 121 and a number of low refractive index layers 122 alternately stacked on one another. The high refractive index layers 231 are, advantageously, comprised of a material selected from a group consisting of tantalum pentoxide ($Ta_2O_5$), zinc sulfide (ZnS) and titanium dioxide ($TiO_2$). The low refractive index layers 232 are, advantageously, made of magnesium fluoride (MgF) or silicon dioxide ($SiO_2$). In the multilayer Low-E film 120, an innermost layer directly formed on the surface of the substrate 110 is the high refractive index layer 121. In order to allow the frequencies of the visible light (i.e., a wavelength range from about 380 nanometers to about 780 nanometers) to effectively pass the substrate 110, and to effectively reflect the IR frequencies (i.e., a wavelength range from about 800 nanometers to about 3000 nanometers), the multilayer Low-E film 120 is configured for having 30 to 40 layers. (That is, a total number of layers N of the multilayer Low-E film 120 is in the range $30 \leq N \leq 40$. Rather suitably, each high refractive index layer 121 is adjacent to each low refractive index layer 122. That is, two sides of each high refractive index layer 121 adjoin two corresponding low refractive index layers 122, and two sides of each low refractive index layer 122 adjoin two corresponding high refractive index layers 121. It is to be understood that other stacking configurations of the high refractive index layers 121 and low refractive index layers 122 could potentially be provided and be within the scope of the multilayer Low-E film 120.

In the present embodiment, a total number of layers of the multilayer Low-E film 120 is 34. In the multilayer Low-E film 120, a number of layers of the high refractive index layers 121 is equal to a number of layers of the low refractive index layers 122. A detailed configuration of the thirty-four layers multilayer Low-E film 120 is recited in the following: a first layer is formed on the surface of the substrate 110, a second layer is formed on the first layer, and the thirty-fourth layer is formed on the thirty-third layer. Rather suitably, all high refractive index layers 121 are disposed in even number of layers of the multilayer Low-E film 120, and all low refractive index layers 122 are disposed in odd number of layers of the multilayer Low-E film 120.

A refractive index of the high and low refractive index layer 121, 122 is respectively represented by $n_H$, $n_L$. A wavelength of light to be reflected is represented by letter $\lambda$. A physical thickness of each high refractive index layer 121 is equal to $\lambda/4n_H$. A physical thickness of each low refractive index layer 122 is equal to $\lambda/4n_L$. In the present embodiment, each high refractive index layer 121 is, usefully, comprised of titanium dioxide (TiO2), and $2.2 \leq n_H \leq 2.7$. Each low refractive index layers 122 is, usefully, comprised of silicon dioxide (SiO2), and $1.2 \leq n_L \leq 1.5$. For example, a wavelength of IR radiation is about 800 nanometers. Thus, using the numerical value of $\lambda$, $n_H$, $n_L$, the respective physical thickness of high and low refractive index layers 121, 122 can be calculated. Accordingly, a configuration/structure of the Low-E glass 100 can be obtained.

The respective physical thickness of the high and low refractive index layers 121, 122, generally, is a theoretical value. A practical physical thickness, usually, may not be consistent with the theoretical physical thickness. Therefore, in practice, the respective physical thickness of the high and low refractive index layers 121, 122 should, usefully, be optimized, according to certain conditions. The optimization process of the multilayer Low-E film 120 can be a simulation process. That is, according to the theoretical configuration of the multilayer Low-E film 120, a computer system simulates a model of the multilayer Low-E film 120 at a certain condition (e.g., a desired light transmittance). In order to fully meet the desired condition, e.g., to achieve the desired light transmittance, the configuration of the simulated multilayer Low-E film 120 may be adjusted by the computer system. The respective physical thickness, of the high and low refractive index layers 121, 122, can be adjusted until the multilayer Low-E film 120 obtains a suitable/satisfying light transmittance. As a result, a respective optimized physical thickness (i.e., a practical physical thickness) of the high and low refractive index layers 121, 122 can be obtained. In the present embodiment, at a condition of the light transmittance being greater than 90%, each layer of the multilayer Low-E film 120 is optimized. As a result, an optimized physical thickness of the first, second and the outermost layer (e.g., the thirty-fourth layer) of the multilayer Low-E film 120, respectively, is $1.18\lambda/(4n_H)$, $1.134\lambda/(4n_L)$, and $\lambda/(8n_L)$.

Figure 2:
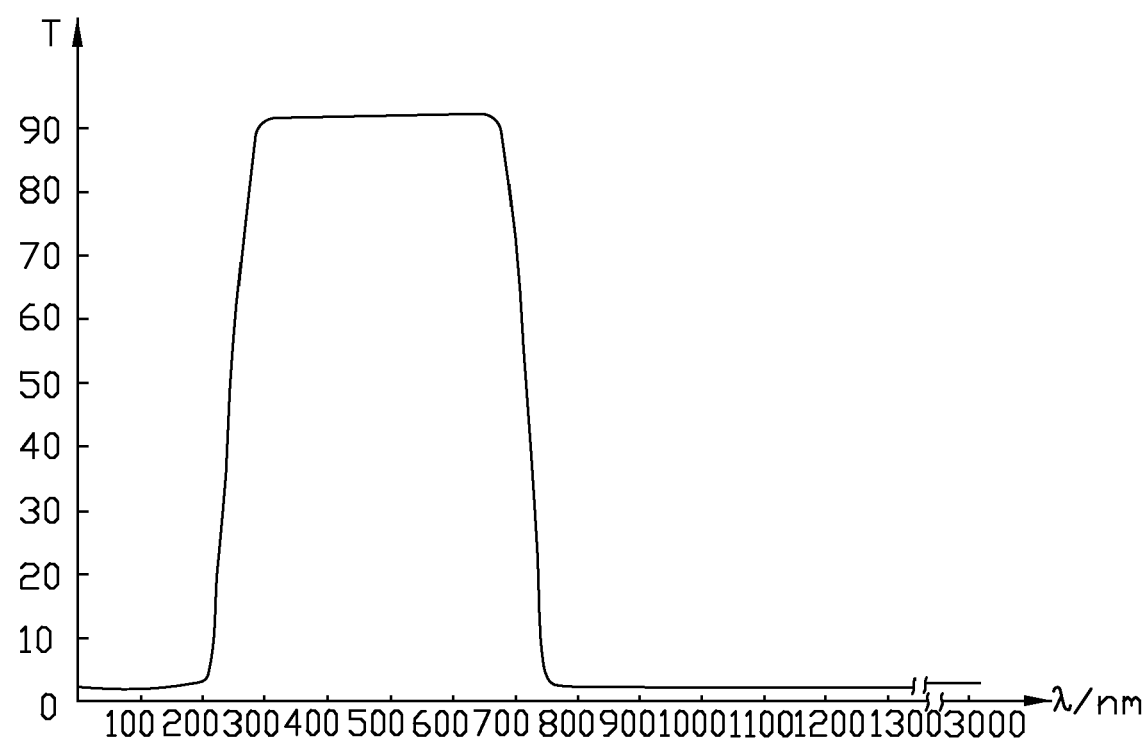
FIG. 2 is a graph, showing a curve of light transmittance versus wavelength, in accordance with the Low-E glass of the first embodiment of FIG. 1.

FIG. 2 shows a light transmittance-wavelength (T-$\lambda$) curve of the Low-E glass 100. Clearly, in the visible light bandwidth, that is, in a wavelength range from 380 nanometers to 780 nanometers, a light transmittance of the Low-E glass 100 is larger than 90%. At the same time, in the IR bandwidth, that is, in a wavelength range from 800 nanometers to 3000 nanometers, a light transmittance of the Low-E glass 100 is less than 5%. In addition, at the wavelength of 800 nanometers, the T-$\lambda$ curve is almost perpendicularly to a horizontal axis (i.e., $\lambda$ axis). That is, for all practical purposes, all frequencies of the visible light are transmitted through the Low-E glass 100, and all IR frequencies are reflected.

With respect to the Low-E glass 100 of the first embodiment, the multilayer Low-E film 120 selectively allows the transmission of the desired light rays, (e.g., the frequencies of the visible light), and reflects the undesired light rays (e.g., the IR frequencies). According to various configurations/structures of the multilayer Low-E film 120, the Low-E glass 100 can allow the desired light frequencies and reflect the undesired light frequencies at various degrees. Compared with the conventional Low-E glass, the present Low-E glass 100 has a relatively high visible light transmittance, i.e., higher than 90%, and has a relatively low IR radiation transmittance, i.e., lower than 5%.

Figure 3:
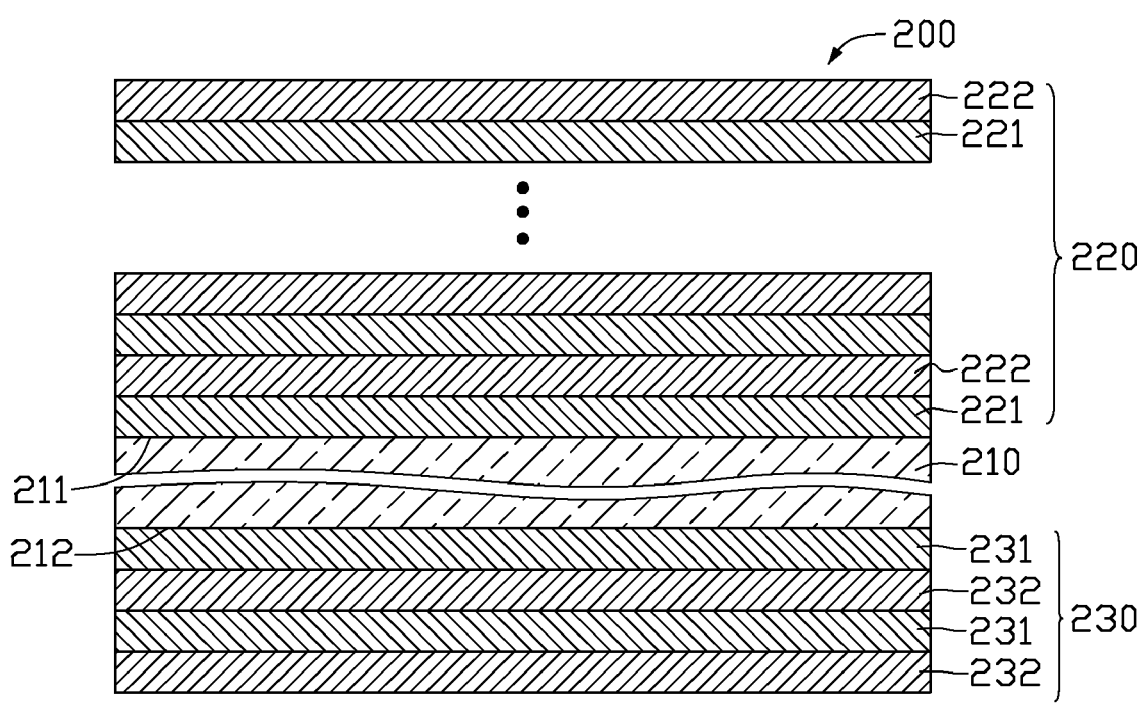
FIG. 3 is a schematic, cross-sectional view of a Low-E glass, in accordance with a present second embodiment, the Low-E glass comprising a glass substrate, and a multilayer Low-E film and an anti-reflecting coating coated on opposite sides of the glass substrate.

Referring to FIG. 3, a Low-E glass 200, according to a second embodiment, is provided. The Low-E glass 200 includes a glass substrate 210, a multilayer Low-E film 220, and an anti-reflecting coating 230. The anti-reflecting coating 230 is used to weaken/prevent the visible light being reflected, thereby enhances the visible light being transmitted through the Low-E glass 200. Therefore, the anti-reflecting coating 230 may, usefully, be configured on a surface of the glass substrate 210, and/or between the glass substrate 210 and the multilayer Low-E film 220, and/or on the surface of the multilayer Low-E film 220. In the present embodiment, the multilayer Low-E film 220 is formed on a first surface 211 of the glass substrate 210, and the anti-reflecting coating 230 is formed a second surface 212 opposite to the first surface 211 of the glass substrate 210.

The multilayer Low-E film 220 has a similar configuration with the multilayer Low-E film 120. That is, the multilayer Low-E film 220 includes a number of high refractive index layers 221 and a number of low refractive index layers 222 alternately stacked on one another. The anti-reflecting coating 230 includes a number of high refractive index layers 231 and a number of low refractive index layers 232 alternately stacked on one another. The high refractive index layers 231 are, advantageously, comprised of a material selected from a group consisting of tantalum pentoxide ($Ta_2O_5$), zinc sulfide (ZnS) and titanium dioxide ($TiO_2$). The low refractive index layers 232 are, advantageously, made of magnesium fluoride (MgF) or silicon dioxide ($SiO_2$). In the present embodiment, the high refractive index layers 231 are comprised of titanium dioxide, and the low refractive index layers 232 are comprised of silicon dioxide.

In the present embodiment, the anti-reflecting coating 230 includes four layers of films, i.e., two high refractive index layers 231 and two low refractive index layers 232. Two high refractive index layers 231 and two low refractive index layers 232 are stacked alternately on the second surface of the glass substrate 210. In detail, one layer of high refractive index layer 231 is formed on the second surface of the glass substrate 210, and one layer of low refractive index layer 232 is formed on the preceding high refractive index layer 231. Then, another layer of high refractive index layer 231 is formed on the preceding low refractive index layer 232, and another layer of low refractive index layer 232 is formed on the preceding another layer of high refractive index layer 231.

Figure 4:
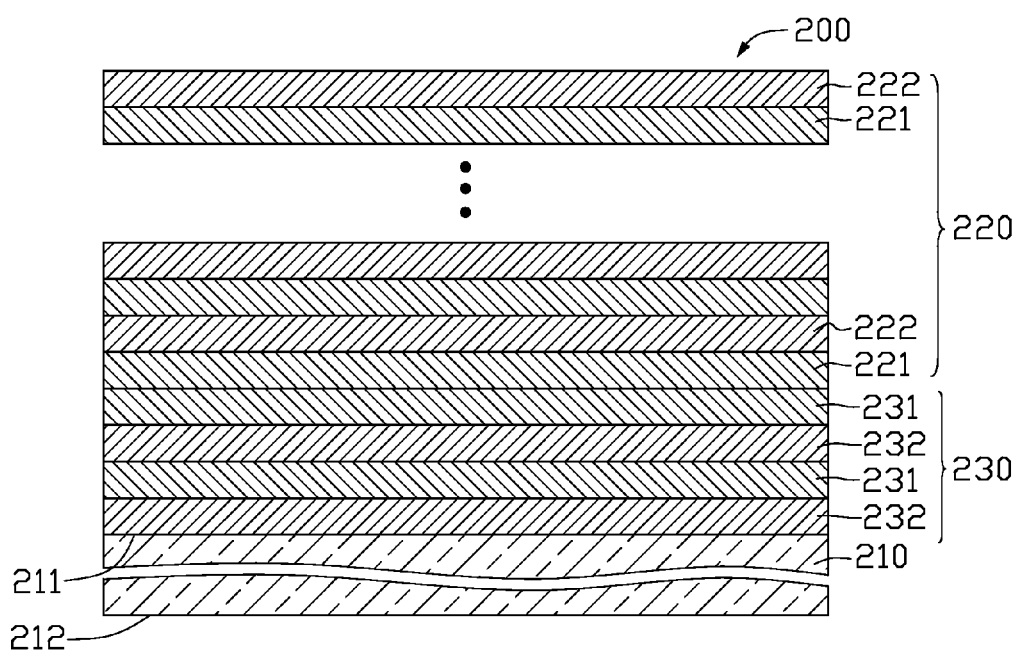
FIG. 4 is similar to FIG. 3, but shows the anti-reflecting coating located in an alternative position, between the glass substrate and the multilayer Low-E film.
Figure 5:
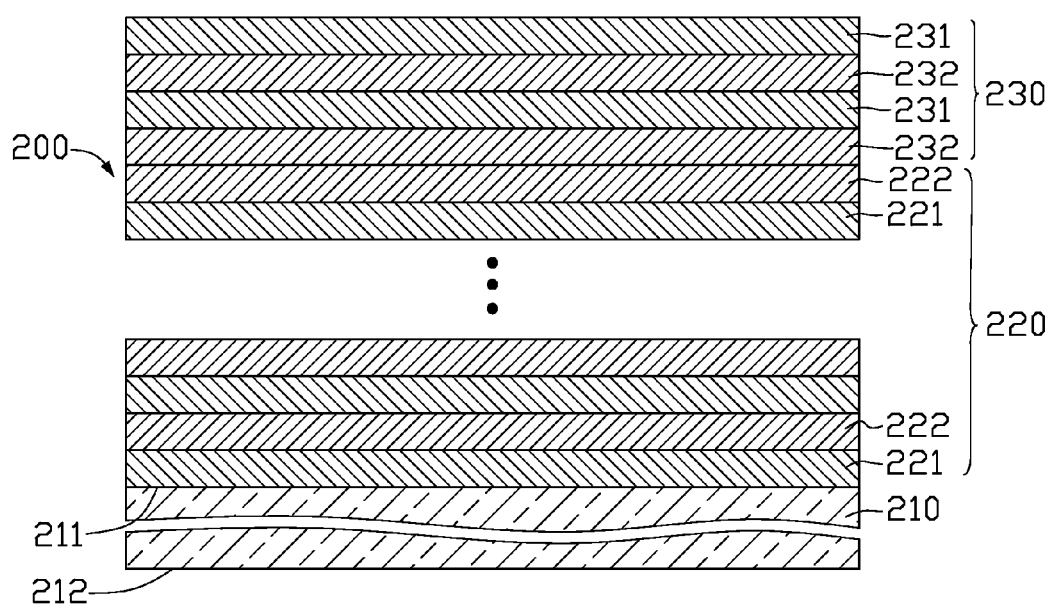
FIG. 5 is similar to FIG. 3, but shows the anti-reflecting coating located in an alternative position, on an outer surface of the multilayer Low-E film.
Figure 6:
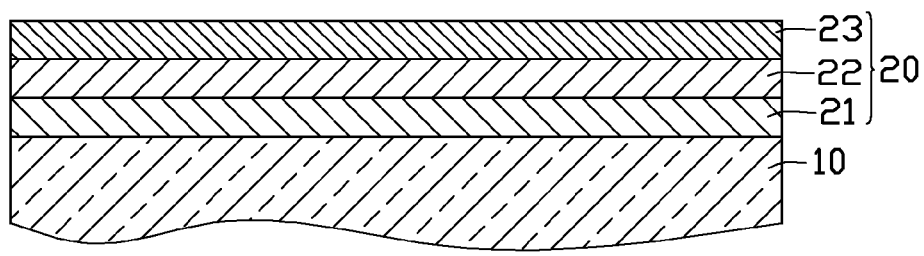
FIG. 6 is a schematic, cross-sectional view of a Low-E glass, in accordance with related art.
Figure 7:
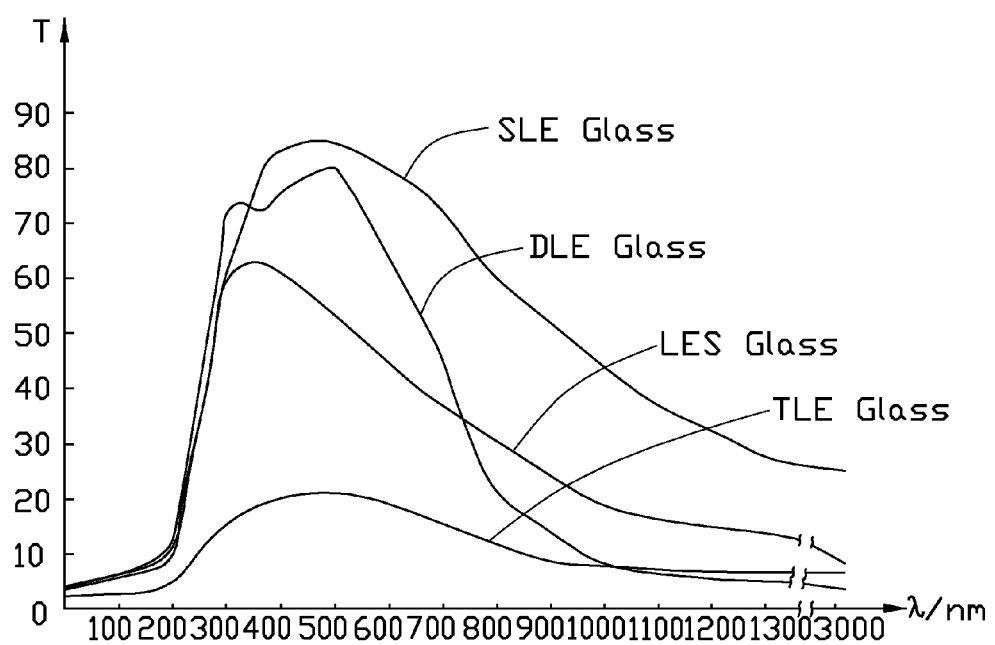
FIG. 7 is a graph showing several curves of light transmittance versus wavelength, in accordance with related art.

With respect to the Low-E glass 200 of the second embodiment, first of all, according to various locations of the anti-reflecting coating 230 (e.g., configured on a bottom surface of the glass substrate 210, see FIG. 3, and/or between the glass substrate 210 and the multilayer Low-E film 220, see for example FIG. 4, and/or on a top surface of the multilayer Low-E film 220, see example FIG. 5), various configurations/structures of the Low-E glass 200 can be obtained. Second, according to various configurations/structures of the Low-E glass 200, the Low-E glass 200 can allow the desired light frequencies to pass therethrough and reflect the undesired light frequencies at any of various degrees of desirability. Finally, compared with the Low-E glass 100 of the first embodiment, because of the function of the anti-reflecting coating 230, the present Low-E glass 200 has a relatively high visible light transmittance and a relatively low IR radiation transmittance.

The Low-E glass 100, 200 are, generally, manufactured by a deposition process. The deposition process relates to physical vapor deposition process and chemical vapor deposition process. In the present embodiment, the multilayer Low-E film 120, 220 and/or the anti-reflecting coating 230 can be usefully formed by a chemical vapor deposition process. The chemical vapor deposition method is in common applied for making the multilayer film structure, so the process for manufacturing the Low-E glass 100, 200 is not recited. It is to be understood that various configurations/structure of the respective high refractive index layer and the low refractive index layer can be achieved by adjusting/controlling process parameters (e.g., temperature, time, pressure, etc.) of the chemical vapor deposition process.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A Low-E glass, comprising:
   a glass substrate; and
   a multilayer Low-E film formed on at least one surface of the glass substrate, the multilayer Low-E film comprising a plurality of high refractive index layers and a plurality of low refractive index layers stacked one on another;
   wherein an innermost layer of the multilayer Low-E film nearest to the surface of the glass substrate is one of the high refractive index layers, each high refractive index layer is configured as an odd-numbered layer of the multilayer Low-E film, and each low refractive index layer is configured as an even-numbered layer of the multilayer Low-E film;
   a physical thickness of each high refractive index layer and each low refractive index layer is equal to $\lambda/4n_H$ and $\lambda/4n_L$, respectively, wherein $\lambda$ is a wavelength of light rays to be reflected by the Low-E glass, and $n_H$ and $n_L$ are refractive indexes of the high and low refractive index layers, respectively; and
   a total number of layers of the multilayer Low-E film is in a range from 30 to 40.

2. The Low-E glass as claimed in claim 1, wherein each high refractive index layer is comprised of a material selected from the group consisting of tantalum pentaoxide, zinc sulfide and titanium dioxide, and each low refractive index layer is made of magnesium fluoride or silicon dioxide.

3. The Low-E glass as claimed in claim 2, wherein each high refractive index layer is comprised of titanium dioxide, a refractive index of the titanium dioxide is in a range from 2.2 to 2.7, each low refractive index layer is made of silicon dioxide, and a refractive index of the silicon dioxide is in a range from 1.2 to 1.5.

4. The Low-E glass as claimed in claim 1, further comprising an anti-reflecting coating configured for inhibiting visible light being reflected from the Low-E glass.

5. The Low-E glass as claimed in claim 4, wherein the multilayer Low-E film is formed on the surface of one side of the glass substrate, and the anti-reflecting coating is configured on the surface of another side of the glass substrate opposite to the side having the multilayer Low-E film.

6. The Low-E glass as claimed in claim 4, wherein the anti-reflecting coating is configured between the multilayer Low-E film and the glass substrate.

7. The Low-E glass as claimed in claim 4, wherein the anti-reflecting coating is configured on a surface of the multilayer Low-E film farthest from the glass substrate.

8. The Low-E glass as claimed in claim 4, wherein the anti-reflecting coating comprises two high refractive index layers and two low refractive index layers, and each high refractive index layer of the anti-reflecting coating is adjacent to a corresponding low refractive index layer of the anti-reflecting coating.

9. The Low-E glass as claimed in claim 8, wherein each high refractive index layer of the anti-reflecting coating is comprised of a material selected from the group consisting of tantalum pentaoxide, zinc sulfide and titanium dioxide, and each low refractive index layer of the anti-reflecting coating is made of magnesium fluoride or silicon dioxide.

10. A Low-E glass, comprising:
    a glass substrate; and
    a multilayer Low-E film formed on at least one surface of the glass substrate, the multilayer Low-E film comprising seventeen high refractive index layers and seventeen low refractive index layers, each high refractive index layer being configured as an odd-numbered layer, each low refractive index layer being configured as an even-numbered layer, and a physical thickness of each high refractive index layer and each low refractive index layer being equal to $\lambda/4n_H$ and $\lambda/4n_L$, respectively, wherein $\lambda$ is a wavelength of light rays to be reflected by the Low-E glass, and $n_H$ and $n_L$ are refractive indexes of the high and low refractive index layers, respectively.

11. A Low-E glass, comprising:
    a glass substrate; and
    a multilayer Low-E film formed on at least one surface of the glass substrate, the multilayer Low-E film comprising seventeen high refractive index layers and seventeen low refractive index layers, each high refractive index layer being configured as an odd-numbered layer, each low refractive index layer being configured as an even-numbered layer, and a physical thickness of the first layer, the second layer and the thirty-fourth layer being equal to $1.18\lambda/(4n_H)$, $1.134\lambda/(4n_L)$ and $\lambda/(8n_H)$, respectively, wherein X is a wavelength of light rays to be reflected by the Low-E glass, and $n_H$ and $n_L$ are refractive indexes of the high and low refractive index layers, respectively.

* * * * *